March 23, 1943. A. L. CHRISTIANSEN 2,314,479
FISH SEGREGATING, SIZING, AND DIRECTING APPARATUS
Original Filed April 1, 1935 2 Sheets-Sheet 1
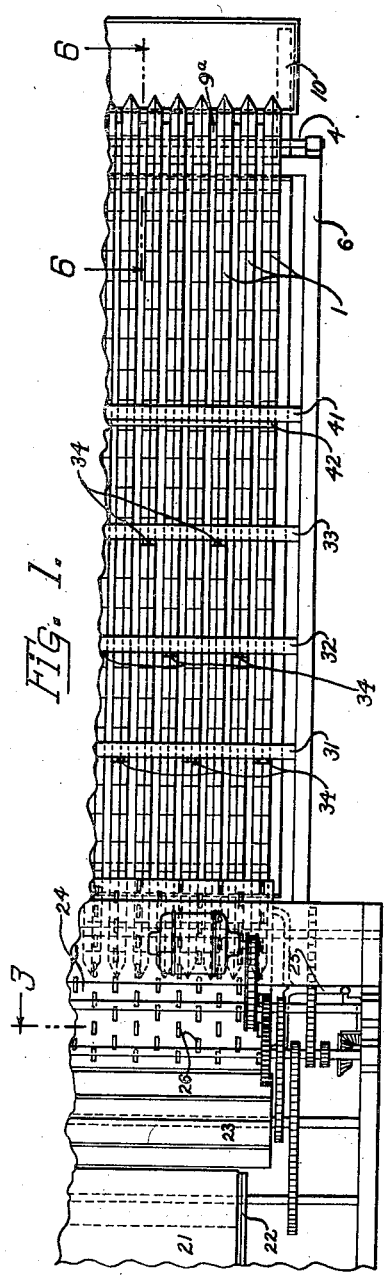
Inventor
A. L. Christiansen
By
William E. Hall
Attorney Inventor
A. L. Christiansen Patented Mar. 23, 1943

2,314,479

UNITED STATES PATENT OFFICE 2,314,479

FISH SEGREGATING, SIZING, AND DIRECTING APPARATUS

Andrew L. Christiansen, Willowbrook, Calif.

Original application April 1, 1935, Serial No. 14,052. Divided and this application March 8, 1940, Serial No. 322,981

15 Claims. (Cl. 209—102)

My present invention relates to an apparatus for segregating, sizing, and directing fish.

One of the principal objects of this invention is to provide a relatively simple machine for segregating different kinds of fish from each other, for sizing all of the fish passing through the machine, and a machine of this class which is economical to operate, and which will not readily deteriorate or get out of order.

An important object of this invention is to provide simple means for directing fish lengthwise into conveying means and sizing openings, and also a machine of the class for preventing fish from riding upon each other in passing through the machine.

An important object also of my machine is to provide means which will receive fish in large quantities and distribute them in a relatively uniform manner for segregating and sizing the same in the machine.

An important object also of this invention is to provide novel and simple means in connection with the sizing portion of the machine for directing the fish with their heads foremost.

A further object of this invention is to provide means for readily adjusting the machine for selecting fish of particular predetermined sizes.

A still further object of this invention is to provide an apparatus consisting of machines of this class for selecting fish of various graduated sizes.

With these and other objects in view, as will appear hereinafter, I have devised a machine of this class having certain novel features of construction, combination, and arrangement of parts and portions, as will be hereinafter described in detail and particularly set forth in the appending claims, reference being had to the accompanying drawings and to the characters of the reference thereon, which form a part of this application, in which:

Figure 1 is a fragmentary plan of my machine in one form of construction;

Figure 2 is a fragmentary side elevational view thereof;

Figure 7:
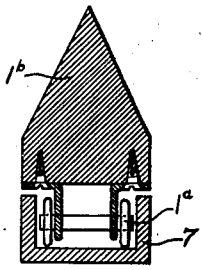

Figures 3, 4, 5, and 6 are enlarged fragmentary sectional views thereof in elevation, taken respectively through 3—3, 4—4, 5—5, and 6—6 of Fig. 1; and, Figure 7 is an enlarged sectional view of one unit of the fish conveyor.

The segregating and sizing portion of my invention consists essentially of a plurality of separate link belt conveyors 1, each extending around sprockets 2 and 3. All of the sprockets 2 are mounted on a shaft 4, and all of the sprockets 3 are mounted on a shaft 5, the shafts being supported on a frame 6. Each of the link belt conveyors consists of a continuous link belt 1a, and a plurality of blocks 1b, these blocks being preferably secured at the under sides to alternate links of a belt. These blocks form with each other an inverted V-shaped ridge at the upper stretch of the conveyor between the sprockets. The upper stretch of the link belt is adapted to ride in a guiding channel 7. The guide channels 7 of all of the conveyors are carried near their opposite ends of transverse supports 8 in such a manner that the channels may be variously spaced from each other, so as to space the longitudinally block-formed ridges the desired distances apart to provide openings between adjacent block-formed ridges for allowing fish of certain sizes to drop through the opening formed between adjacent conveyors.

Below the upper stretches of the belt conveyors, and between the sprockets at the opposite ends of the conveyors, is a wide chute 9 for receiving the fish dropping between the conveyors. This chute is inclined downwardly toward one side of the battery of conveyors so that they may pass downwardly to the low end of the chute.

At the discharge end of the battery of conveyors is another chute 10 which is adapted to receive the fish not dropping between the conveyors, these being the larger fish.

The conveyors are so constructed that the body portions of the fish may drop downwardly through the openings to spaces between adjacent conveyors, but the spaces are such that the heads will not pass through, the gills of the fish being caught at the lower inclined portions of the adjacent conveyors. As the fish are carried by the conveyors with their bodies dangling between and below the upper stretches of the conveyors, these dangling or depending portions may strike the shaft 4 or may become entangled in the chains and sprockets. For this reason, I have provided a guard 11 between the sprockets 2 and the chute 9, the upper portion of the guard being near the sprocket 2. This guard is provided with a plurality of tongues 9a which extend forwardly between the conveyors. As the fish are carried forwardly between and by the conveyors, the dangling bodies engage the guard 9, are turned to horizontal positions, and discharged head foremost into the chute 10.

The fish, to be segregated and sized, are deposited at the ends opposite the ends first described. The means shown is a feed conveyor 21 which may have side guards 22. At the discharge end and transversely of the feed conveyor is a horizontal star or paddle wheel 23 which is rotated in the direction of the arrow and is adapted to receive the fish from the feed conveyor and deposit the same more uniformly on the riffle board 24. This riffle board is inclined downwardly from the star wheel to the feed end of the conveyors 1. The riffle board is adapted to be shaken transversely by a crank or other means 25, or other suitable mechanism. This riffle board is preferably provided with longitudinal ridges 26 to retard the movement of the fish and more uniformly to discharge the same on the feed ends of the conveyors 1.

The batteries of conveyors 1 are bridged forwardly of the riffle board as indicated by 31, 32, and 33. Each of the bridges have arms 34 which extend downwardly to the ridges of the conveyors 1. The bridge 31 is shown as having arms extending downwardly towards the first and fourth conveyors, the bridge 32 as having arms extending downwardly towards the second and fifth, and so forth. Thus, the arms are staggered with respect to each other. The purpose of these arms is to provide obstructions for fish carried crosswise on top on the conveyors 1 and to rotate the fish so that they may drop into the channels at the opposite sides of the arms or obstructions. The arms or obstructions are staggered so as to keep successive fish from being blocked or jammed against the obstructions.

The arms or obstructions 34 are bifurcated at their lower ends and straddle the ridges of the conveyors 1, thereby preventing fish being caught between the conveyors and arms 34.

Figure 3:
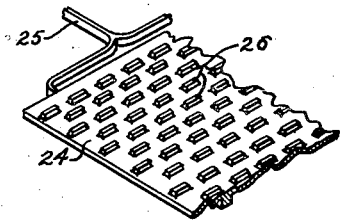
Figure 4:
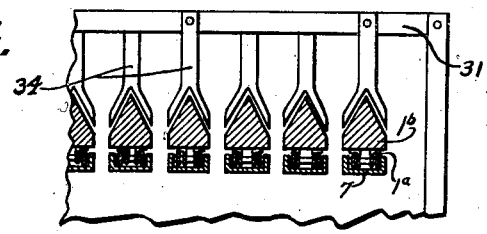
Figure 5:
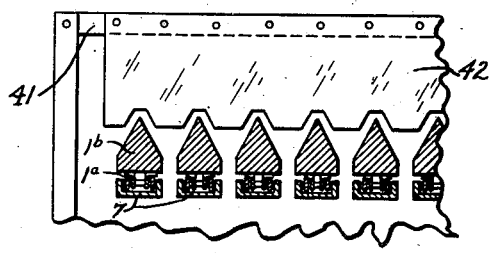
Figure 6:
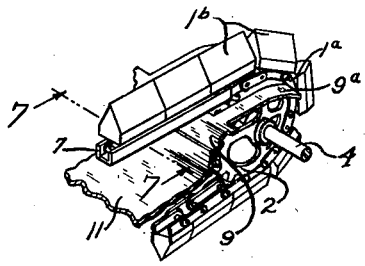

A bridge 41 is also provided forwardly of the bridge 33, and this bridge 41 is provided with downwardly extending teeth, which are provided at the lower edge of the plate 42 depending from the bridge, as shown best in Fig. 5. These teeth extend between the conveyors or into the longitudinal passage between adjacent conveyors. The purpose of these fingers is to prevent fish from riding on top of each other.

Though I have shown and described a particular construction, combination, and arrangement of parts and portions, I do not wish to be limited to the same, but desire to include in the scope of my invention the construction, combination, and arrangement substantially as set forth in the appending claims.

I claim:

1. In an apparatus of the class described, a plurality of horizontal and horizontally spaced parallel conveyors having discharge ends, each conveyor comprising substantially inverted V-shaped ridges, and means between adjacent conveyors, and near the bottom and discharge ends of the upper stretches of the conveyors, providing obstructions for engaging fish carried by and between adjacent conveyors, for tilting depending portions of the fish backwardly as the conveyors are advanced, the end portions of the means adjacent the discharge ends of the conveyors being spaced backwardly from the outer ridges of the conveyors.

2. In a machine for sizing fish, a pair of spaced parallel conveyors, said conveyors having therebetween a substantially V-shaped channel open at the bottom for conveying fish therebetween with their gills supported by the opposite conveyors and their bodies depending therefrom, said fish being discharged from one end of the conveyors, and a fish tilting guide located longitudinally between the conveyors at the discharge end of the latter, the guide being spaced below the upper portion of the conveyors.

3. In a machine for sizing fish, a pair of spaced parallel conveyors, said conveyors having therebetween a longitudinal channel having an open bottom for conveying fish therebetween with their gills supported by the opposite conveyors and their bodies depending therefrom, said fish being discharged from one end of the conveyors, and a fish tilting guide located longitudinally between the conveyors at the discharge end of the latter, the guide being spaced below the upper portion of the conveyors, and the end of the former inwardly from the discharge end of the conveyors.

4. In an apparatus of the character described, a plurality of parallel, horizontal, synchronized belt conveyors, each consisting of a continuous flexible belt and successive blocks of inverted V-shaped cross-section, the blocks being secured with the wide portions of their V-shaped cross-section to the outer side of the belt, and arranged longitudinally with respect thereto, the successive blocks forming spaced longitudinal ridges for the respective conveyors, and the blocks of adjacent conveyors providing longitudinal V-shaped channels therebetween, with the channels open at their lower portions.

5. In an apparatus of the character described, a plurality of spaced parallel conveyors of such cross-section as to form assorting channels between adjacent conveyors, and a plurality of fingers, each finger extending downwardly into one channel and substantially across the upper portion of the same, the lower ends of the fingers being located a sufficient distance above the lower portions of the channels to allow a portion of the product conveyed in the respective channels to pass below the fingers extending therein.

6. In an apparatus of the character described, a plurality of spaced parallel conveyors of such cross-section as to form upwardly diverging assorting channels between adjacent conveyors, and a plurality of fingers, each finger extending downwardly into one channel and substantially across the upper portion thereof, the lower ends of the fingers being located a sufficient distance located above the lower portions of the inclined sides of the channels to allow a portion of the product conveyed in the respective channels to pass below the fingers extending therein.

7. In an apparatus of the character described, a plurality of spaced parallel conveyors of such cross-section as to form assorting channels between adjacent conveyors, a vertical plate member positioned transversely of said conveyors immediately above the latter, said plate member having recesses in its lower edge receiving said conveyors and the lower edge portion between said recesses extending into the assorting channels.

8. In an apparatus of the character described, a plurality of spaced parallel conveyors of such cross-section as to form assorting channels between adjacent conveyors, a plurality of stop fingers, each finger extending downwardly into one channel and substantially across the upper portion of the same, the lower ends of the fingers being located above the lower portions of the channels, and a plurality of straightening fingers located ahead of the stop fingers with respect to the movement of travel of the conveyors, the straightening fingers extending to near the top of the conveyors, said straightening fingers being positioned in staggered relation with respect to each other.

9. In an apparatus of the character described, a plurality of spaced parallel conveyors of such cross-section as to form upwardly diverging assorting channels between adjacent conveyors, a plurality of stop fingers, each finger extending downwardly into one channel and substantially across the upper portion thereof, the lower ends of the fingers being located above the lower portions of the inclined sides of the channels, and a plurality of straightening fingers located ahead of the stop fingers with respect to the movement of the conveyors, the straightening fingers straddling the ridges of the conveyors and positioned in staggered relation with respect to each other.

10. In a machine of the character described, a longitudinally channeled conveying means, a riffle board located at the head of the conveying means, said riffle board comprising a table inclined downwardly towards the conveying means, and means for reciprocating the table laterally with respect to the conveyor means, said table having laterally spaced rows of ridges extending longitudinally with respect to the conveying means, said rows forming longitudinal channels therebetween, the latter channels being positioned in substantial alignment with the channels of the conveying means.

11. In a machine of the character described, a longitudinally channelled conveying means, a riffle board located at the head of the conveying means, said riffle board comprising a table inclined downwardly towards the conveying means, and means for reciprocating the table laterally with respect to the conveying means, said table having laterally spaced rows of ridges extending longitudinally with respect to the conveying means, said rows forming longitudinal channels therebetween, the latter channels being positioned in substantial alignment with the channels of the conveying means, the ridges in the adjacent rows being staggered with respect to each other.

12. In an apparatus of the character described, a plurality of horizontal and horizontally spaced parallel conveyors having discharge ends, the conveyors comprising substantially inverted V-shaped ridges, and means between adjacent conveyors, and near the bottom and discharge ends of the upper stretches of the conveyors, providing obstructions for engaging fish carried by and between adjacent conveyors, for tilting depending portions of the fish backwardly as the conveyors are advanced.

13. The herein described method of sizing fish consisting in: conveying fish in a substantially horizontal path having a restricted channel; causing the body portions of the fish to drop by gravity through the channel with the heads of the fish retained above the channel; smaller size fish caused by gravity to drop wholly through said channel; conveying the retained fish in the original path; then raising the depending bodies of the fish in the channel to substantially horizontal positions near the end of said path; and then projecting the latter fish beyond said path.

14. In a machine of the class described, a riffle board comprising an inclined table, and means for reciprocating the table laterally with respect to the direction of inclination, said table having laterally spaced rows of ridges extending longitudinally with respect to the direction of inclination, said rows forming longitudinal and downwardly inclined channels therebetween.

15. In a machine of the class described, a riffle board comprising an inclined table, and means for reciprocating the table laterally with respect to the direction of inclination, said table having laterally spaced rows of ridges extending longitudinally with respect to the direction of inclination, said rows forming longitudinal and downwardly inclined channels therebetween, the ridges in the adjacent rows being staggered with respect to each other.

ANDREW L. CHRISTIANSEN.